(12) United States Patent
Sárosi (10) Patent No.: US 10,199,656 B2
(45) Date of Patent: Feb. 5, 2019

(54) BATTERY GRID, BATTERY CELL COMPRISING THE BATTERY GRIDS AND STORAGE BATTERY COMPRISING THE BATTERY CELLS

(71) Applicant: George Andrew Sárosi, Sárvár (HU)

(72) Inventor: George Andrew Sárosi, Sárvár (HU)

(*) Notice: Subject to any disclaimer, the term of this patent is extended or adjusted under 35 U.S.C. 154(b) by 150 days.

(21) Appl. No.: 15/312,989

(22) PCT Filed: May 19, 2015

(86) PCT No.: PCT/HU2015/000046
§ 371 (c)(1),
(2) Date: Nov. 21, 2016

(87) PCT Pub. No.: WO2015/177578
PCT Pub. Date: Nov. 26, 2015

(65) Prior Publication Data
US 2017/0179496 A1    Jun. 22, 2017

(30) Foreign Application Priority Data
May 20, 2014  (HU) ...................................... 1400252

(51) Int. Cl.
*H01M 4/73* (2006.01)
*H01M 2/28* (2006.01)
(Continued)

(52) U.S. Cl.
CPC ............... *H01M 4/73* (2013.01); *H01M 2/28* (2013.01); *H01M 4/14* (2013.01); *H01M 4/16* (2013.01);
(Continued)

(58) Field of Classification Search
CPC ..................................................... H01M 4/73
See application file for complete search history.

(56) References Cited

U.S. PATENT DOCUMENTS 839,711 A    12/1906  Bijur
3,556,854 A *  1/1971  Wheadon et al. ...... H01M 4/73
                                                    429/211
(Continued)

FOREIGN PATENT DOCUMENTS

GB          129425 A    7/1919
GB        1 314 243 A    4/1973

OTHER PUBLICATIONS

International Search Report for PCT/HU2015/000046 dated Sep. 24, 2015.

(Continued)

*Primary Examiner* — Scott J. Chmielecki
(74) *Attorney, Agent, or Firm* — Birch, Stewart, Kolasch & Birch, LLP (57) ABSTRACT

Battery grid (1) comprising a grid structure (4) containing grid arms (2, 2') and bordering arms (3), a supporting element (5) and lugs (6), as well as lead paste (7) spread on the surface of the supporting element (5). The invention also relates to a battery cell (35) comprising the battery grids (1) with separator plates (38) placed between them. The invention further relates to a storage battery (42) comprising battery cells (35) filled with acid. The supporting element (5) comprises fiberglass based material onto which the grid structure (4) is secured through chemical bond formed between the lead and the fiberglass. The lead paste (7) is secured to the supporting element (5) through chemical bond and the grid structure (4) has more than one lug (6). The battery cell (35) is composed of the battery grids (1). The lugs (41, 42) are connected to a jointing element (8). The storage battery (42) comprises the battery cells (35).

20 Claims, 8 Drawing Sheets

(51) Int. Cl.
*H01M 4/16* (2006.01)
*H01M 4/84* (2006.01)
*H01M 4/14* (2006.01)
*H01M 4/20* (2006.01)
*H01M 10/14* (2006.01)

(52) U.S. Cl.
CPC ............... *H01M 4/20* (2013.01); *H01M 4/84* (2013.01); *H01M 10/14* (2013.01); *H01M 2220/20* (2013.01)

(56) References Cited

U.S. PATENT DOCUMENTS

| | | | | |
|---|---|---|---|---|
| 5,527,642 | A * | 6/1996 | Meadows | H01M 2/0237 429/178 |
| 2002/0150822 | A1 * | 10/2002 | Marlow | H01M 4/73 429/241 |
| 2010/0183920 | A1 * | 7/2010 | Shaffer, II | H01M 2/16 429/210 |
| 2011/0206956 | A1 * | 8/2011 | Woods, Jr. | H01M 2/12 429/53 |
| 2012/0094182 | A1 * | 4/2012 | Hirose | H01M 4/73 429/241 |
| 2013/0065121 | A1 * | 3/2013 | Harker | H01M 4/72 429/211 |
| 2013/0216857 | A1 * | 8/2013 | Dhar | H01M 4/685 428/615 |
| 2014/0087237 | A1 * | 3/2014 | Dhar | H01M 4/14 429/160 |
| 2014/0212764 | A1 * | 7/2014 | Fujita | H01M 4/742 429/241 |

OTHER PUBLICATIONS

Written Opinion of the International Searching Authority for PCT/HU2015/000046 dated Sep. 24, 2015.

\* cited by examiner

BATTERY GRID, BATTERY CELL COMPRISING THE BATTERY GRIDS AND STORAGE BATTERY COMPRISING THE BATTERY CELLS

The invention relates to a battery grid comprising a grid structure composed of grid arms and bordering arms made of lead or lead alloy, a supporting element and lugs, and lead paste applied on the surface of the supporting element between the grid arms and the bordering arms. The invention also relates to a battery cell comprising positive and negative polarity battery grids and separator plates placed between the battery grids, the battery cell is placed in a battery housing filled with battery acid. The invention further relates to a storage battery comprising battery cells filled with acid.

In our days protection of the environment and producing environmentally sound energy are essential tasks. More and more energy is required in the field of the developing electric car industry, in green farms operating in island mode, or in different fields using conventional and renewable energy. Countries, continents developing rapidly consume more and more energy. Conventional fossil energy cause severe damage to the environment and to the climate. Generation of the fossil energy took four hundred billion years while its return to the environment took 200 years. It means that it got back to the atmosphere two million times faster than it was generated under the ground. An automatic consequence of this is that storage and transmission of energy are required more than ever. Considering these facts gave the basis of the solution of the present invention.

Typically, the material, the thickness, the geometry and the mass of the grids produced by almost all of the earlier methods were limited consequently they did not meet the optimal requirements. A high capacity storage battery essentially requires a stable, contoured grid the material, the thickness and loading capacity of which is much better than that of the known batteries. During manufacture the correct temperature must be ensured, controlled continually from casting through shaping till the product is finished and hardened. In case of electric cars and also in other fields ensuring the rapid charge and discharge is essential. The electric vehicle industry basically uses, stores and charges clean energy. Almost all component parts—safety and comfort equipment from the ABS break system to the sliding roof—of the high-tech vehicles are controlled by computers. Therefore the reliable energy source ensuring safe operation is a fundamental condition. Lack of this the vehicle cannot be started, parked or stopped. Today's batteries are not suitable for this task even if the engine of the vehicle is petrol or diesel powered.

Some car factories (Mercedes, Audi) realized that the size of the active surface is important so they installed 36V or 48V battery in their cars above mid-category. However, this battery is only different from the conventional ones in its size. It comprises more cells, it is larger and heavier. The battery grids were produced by the conventional methods consequently they had the same disadvantages as the smaller batteries. The electric energy produced in the batteries depends on the amount, the surface, the quality and pureness of the materials used in the reversible chemical process. So the energy is produced by the chemical reaction occurring on the meeting surface of the lead paste applied on the lead grid and the acid (active surface). Similarly, this surface is responsible for recharge. Thus by increasing the surface the generated current and also the amount and speed of rechargeability increase progressively. Additionally, cold ignition is guaranteed by the large active surface.

Various technologies are known in manufacturing battery grids.

In case of gravity casting the casting die consists of two bulky parts which are kept on steady temperature. With the two parts closed together molten lead is filled from above which rapidly congeals in the grid pattern cut in the inner surface of the casting die when temperature is set properly. After opening up the casting die the complete grid can be taken out. A disadvantage of this method is that in another, previous method lead-antimony alloy must be produced using melting, which destroys nature, harmful and requires much energy because the whole amount of lead must be melted. Unalloyed lead without antimony is not able to fill in the casting die consequently the technology and an apparatus of this kind cannot be used with pure unalloyed lead. Because of the presence of antimony the material becomes bimetallic in such a manner that the internal material structure will continuously corrode. This corrosion results in unavoidable deterioration of the batteries having cast grids in 3-4 years. Another disadvantage of the antimony is that it makes the grid entirely brittle. In case of cold ignition when high load current is applied the grid will get warm and because of its rigidity it is not able to deform flexibly and the fibres of the grid will break. As a result, on the one hand, the paste will come off from the broken grid which means loss of the active surface, and this paste falling to the bottom will cause short-cut in the cells, on the other hand the grid is not able to conduct electricity. During manufacturing a pair of grids are cast one after the other. This is a slow, uneconomical process that involves great loss of energy. This technology requires a great amount of lead alloy to be kept at a time in steady molten state which involves permanent emission of dangerous lead fume, sublimation.

In comparison with casting, stretch rolling is a substantially more efficient method. In this case lead must be alloyed with calcium. This base material is brought through a multistage rolling train until at last its proper thinness is obtained. The sheet lead produced in this way then comes to a stretching apparatus where during continuous drawing, after performing evenly spaced cuttings it is also drawn laterally. In this way the final mesh grid is produced, then it is provided with positive or negative electrode active mass material, cut to size and after drying it is ready for installation. The method of making calcium-lead alloy is expensive and dangerous. However, lead cannot be stretched without it because it will break. Alloying in this case also involves melting of the whole amount of material. As it is manufactured and cut into pieces in the form of a strip, the grid does not have a frame at the side. It is disadvantageous with respect to current conduction as the internal resistance is increased and also with respect to assembling because the grid may pierce the insulator being between the positive and negative plates causing short-circuit and breaking off the mass. This grid carries the same disadvantages as the previous one, that is: it is expensive, bimetallic and susceptible to corrosion, the plate is brittle, does not retain the mass properly, has high internal resistance, and the ratio of performance/mass is unfavourable.

In case of centrifugal casting the material is filled in between aluminium sheets or sandwich sheets produced by forging, into so called storage cassettes. This procedure is very complicated and expensive. The sandwich sheets forming the casting die are produced by forging. The three layered casting die does not meet the essential requirements because of forging. This method provides only a surface which cannot be closed together accurately consequently the casting die is not able to maintain the lead introduced into it even when applying firm pneumatic pressure. Preparation and mould separation are unaccomplished. After many attempts it still did not come up to expectations and it is not used.

Another method in which casting is performed between a pair of cylinders also has certain technological shortcomings. The molten lead is introduced into the grid patterns etched in the superficies of the cylinders rotated inversely at a constant speed and equivalent revolutions per minute. The lead congeals in the recessed patterns and leaves from between the cylinders as the finished product, the grid. The problem with this solution is that sudden change of physical state must be ensured. According to this method the molten lead is applied on the curvatures of the cylinders above their centre lines and is pressed in between the grid patterns from above—this is the casting phase. During rotation the two sides of the same cylinder execute two different technological phases. To function properly, the cylinder must operate at a relatively high revolution per minute while a great temperature difference must be ensured for the two sides. A sudden loss of heat is needed for changing the physical state i.e. for setting which cannot be realized even if applying a cold medium immediately.

In another method the lead grid is cast by means of a surface treated profiled steel strip and an inversely rotated surface treated metal cylinder the diameter of which is fairly large. The disadvantage of this method is that the mass, the material and the properties of the strip and the cylinder are different consequently heating of them to the same temperature and keeping them at uniform temperature are problematic. Further, uniform hardening at the various critical points cannot be ensured. Another problem is cooling at the output side where change of physical state should take place. It cannot be solved safely. The biggest problem is that the required optimal operating temperature for the next cycle cannot be realized. Heat transmission at this point cannot be solved. The side of the cylinder where the grid leaves after casting is cooled continuously for setting while the other side of the same cylinder arrives in the casting phase where its temperature must be correct for casting. The temperature difference between the two sides of the shaping cylinder is great therefore they cannot be heated and cooled simultaneously in a short time. The molten material should be cooled down considerably for solidification—this is the setting phase. This cannot be realized along such a short portion of the superficies of the cylinder in such a short time. To this heat stabilization, heat tunnel is needed. Further, when a cylinder and a shaping strip are used for casting continuous closure between the superficies of the cylinder and the strip during casting phase is difficult to ensure.

Patent application WO 03/038933 of the present applicant describes a grid for lead battery, method and apparatus for manufacturing the same and a battery plate. Charging and discharging of the battery provided with the battery plate according to the invention is uneconomical because of the single lug and the grid design. It is more difficult to charge and can be loaded with less current. The newly designed battery grid according to the present invention is produced essentially as it is described in WO 03/038933. However, for the sake of completeness the apparatus and method are described in the present invention, too. By using number of lugs the charging time is significantly decreased while loadability is increased. The tracing of the grid-lines improve the current distribution during charge and discharge. Battery grid having number of lugs has not been produced earlier as connecting of the lugs appropriately and coupling them to the output of the battery have not been solved. The battery grid described in patent application WO 03/079481 is provided with two lugs; however, only one lug is used. This arrangement is not suitable for series connection of the cells built with grids. It is clear from the description that the idea of using more than one lug did not even occur to the inventor. The document teaches battery with gel blanket. Typically, the solution according to WO 03/079481 relates to AGM (Absorbed Glass Matt) batteries. It has a boron-silicate separator between the battery plates in order to prevent cell short circuit between or under the plates. Most of the AGM batteries are suitable for gas recombination which means that the loss of fluid is minimal during charge/discharge.

U.S. patent application No. 6,232,018 describes an electrode plate for lead acid accumulator and its producing method. The electrode plate comprises a woven base made of fibres containing 60-90 wt % cadmium and lead alloy mixed homogeneously. A grid structure having a plurality of strips extending radially and connected to the lug is fixed to the base. The battery grids are connected through the lugs of the grid structure. In the method of producing the battery grid the lead and lead alloy fibres are cut into short sections and are poured into a sticky solution and they are mixed with each other homogeneously.

U.S. patent application No. 4,744,540 describes a casting mould for manufacturing grid plate for lead batteries comprising easily interchangeable mould inserts for each half of a two-part, external metallic mould holder. The mould inserts are made of a highly porous microfiber nonwoven material, having good thermal insulating properties, high permeability to air and non-wettability by lead. The casting mould inserts are manufactured in a process which involves fixing of the non-woven material with a curable binder either during or after shaping of the negative for the grid plate, so that the resulting parts assume a cardboard-like consistency.

These solutions are entirely different from the solution of the present invention and they are not suitable for realizing the aim of the present invention.

The known solutions even if the combination of them do not provide suitable directives for realizing the battery grid according to the present invention. Consequently, battery cells and batteries provided with the battery grid according to the present invention cannot be realized on the basis of the known solutions.

The aim of the present invention is to make charging of the battery possible in a considerably shorter time and to ensure a greater loadability. To this the internal active surface of the grid, the armature and the current paths are split. Extracting and recharging of the energy should be performed by using the whole surface not only through a single lug point and its unidirectional current path.

It has been realized that by providing lead grids of optimal thickness the active surface can be multiplied in the same cubic content. In this manner the charging time can be reduced even to its one-eights; the performance is increased significantly; the performance-to-mass ratio is improved; and a mechanically more stable and shock-resistant energy source can be provided. By a longer casting stage the grid can be perfectly formed between the shaping halves and at the end of the procedure the new heat tunnel ensures suitable heat stabilization. It guarantees reliable solidification of the finished product. Pure lead grid or type of alloying elements are used which does not cause chemical or electric stress within the material. Consequently grid corrosion is prevented thereby significant increase of lifetime is ensured. By using fibreglass based supporting element falling off the mass and self-discharge is prevented, manufacturing is cheaper and environmentally safe, there is no need for pre-alloying and after the battery is worn out it can be recycled. It has also been realized that when number of current paths and lugs are used, then during charge more energy can be simultaneously filled in through the number of lugs and current paths, as a multiplied surface, in an optimal case the whole surface operates. That is, the entire grid surface or the entire surface of each of the grids operates.

Similarly, the produced energy can be simultaneoLisly put out through several lugs. That is, significantly more energy can be extracted in a unit of time.

In one aspect the invention is a battery grid comprising a grid structure composed of grid arms and bordering arms made of lead or lead alloy, a supporting element and lugs, and lead paste applied on the surface of the supporting element between the grid arms and the bordering arms. The supporting element comprises fiberglass based material. In the grid structure more than one lug is arranged in a given distance—preferably equidistant—from each other along the bordering arm. From the lugs grid arms the number of which equals to the number of the lugs are directed to the geometrical centre point of the battery grid. Within the bordering arms, between the grid arms which are connected to the lugs further grid arms are formed. The grid arms are in galvanic connection with each other, with the bordering arms and the lugs.

In another aspect the invention is a battery cell comprising positive and negative polarity battery grids placed in a battery housing filled with battery acid. Between the battery grids separator plates are placed. The battery cell is composed of pairs of battery grids comprising a first battery grid and a second battery grid. The pair of battery grids comprises two identically formed battery grids placed on each other reversely in such a manner that their bordering arms overlap each other but the lugs of the reversed battery grid and the lugs of the normally positioned battery grid do not overlap each other. That is, the lugs of the essentially overlapping battery grids are freely accessible. The separator plates are inserted in between the battery grids. The battery cell comprises several pairs of battery grids insulated from each other by the separator plates. The overlapping pairs of battery grids are arranged in parallel planes, on a common axis which is vertical to their planes. The overlapping lugs of each of the first battery grids are connected with each other galvanically by means of a joining element. Further, the overlapping lugs of each of the second battery grids are also connected with each other galvanically by means of a joining element. The joining elements connected to the same battery grid are also connected with each other. The battery grid system built in this manner is placed in the battery housing filled with battery acid. The connected lugs of the first battery grids and the connected lugs of the second battery grids are polarized differently, either positively or negatively.

In a further aspect the invention is a storage battery composed of the above described battery cells filled with acid. The storage battery contains several battery cells electrically connected with each other serially or parallel according to their polarity.

The inventions will be described with reference to the accompanying drawings in which.

Figure 1:
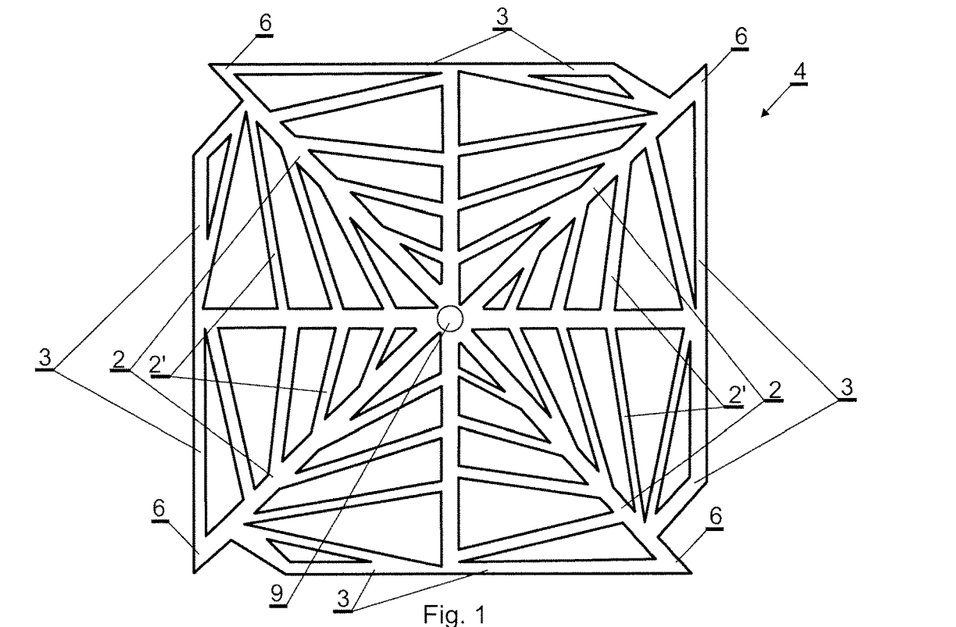
FIG. 1 is the plan view of an embodiment of the grid structure.
Figure 2:
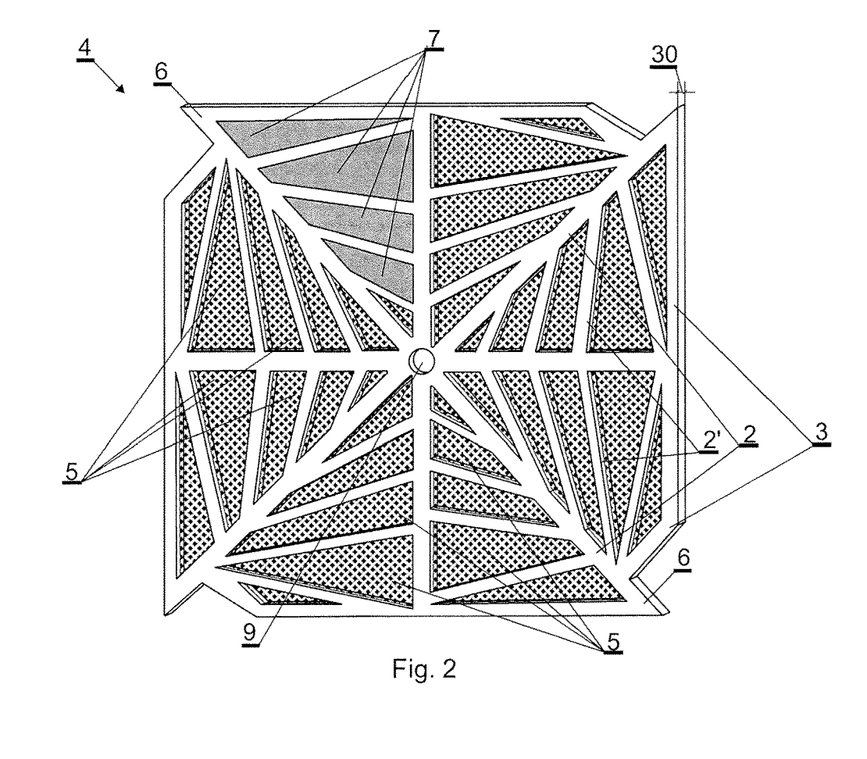
FIG. 2 is the perspective view of the grid structure according to FIG. 1 formed on supporting element and partially coated with lead paste.
Figure 3:
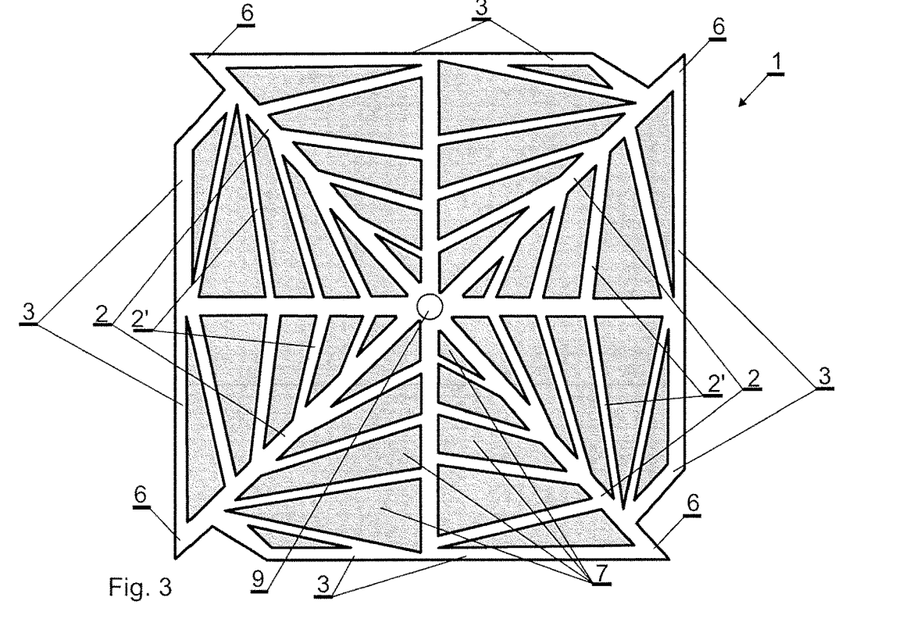
FIG. 3 is the plan view of the battery grid, namely the grid structure formed on the supporting element and coated with lead paste.

The present inventions are based on the embodiment of the battery grid 1 (FIGS. 1-3). The manufacturing method of the battery grid 1 has been taught earlier in our patent application WO 03/038933, however, for the sake of completeness this method is described also in the present description together with the apparatus comprising the grid structure manufacturing machine 33 (FIGS. 9-10) and the pasting machine 34 (FIGS. 11-12) for implementing the method. The battery grid 1 comprises a grid structure 4 composed of grid arms 2 and bordering arms 3 made of molten lead or lead alloy 19, supporting element 5 and lugs 6, as well as lead paste 7 applied on the surface of the supporting element 5 between the grid arms 2 and bordering arms 3. The supporting element 5 comprises fibreglass based material. The grid structure 4 is fixed to the supporting element 5 through chemical bond formed between the molten lead or lead alloy 19 and the fibreglass material of the supporting element 5. The lead paste 7 is secured to the supporting element 5 through chemical bond formed between lead paste 7 and the fiberglass material of the supporting element 5. In the grid structure 4 more than one lug 6 is arranged in a given distance—preferably equidistant—from each other along the bordering arm 3. From the lugs 6 grid arms 2 the number of which equals to the number of the lugs 6 are directed preferably to the geometrical centre point of the battery grid 1. Within the bordering arms 3, between the grid arms 2 which are connected to the lugs 6 further grid arms 2' are internally formed. The grid arms 2,2' are in galvanic connection with each other, with the bordering arms 3 and the lugs 6.

Since a thin lead-oxide pellicle can be found on the surface of the molten lead, with silicon-dioxide which makes a considerable part of the fibreglass, this will form pentaplumbo-trisilicatex $(5PbO+3SiO_2=Pb_5Si_3O_{11})$. This compound or bond can be produced immediately on the meeting surfaces of the two materials at even zero ° C. (up to 450° C.) and assures strong adhesion between lead and fibreglass without the need of pressing as soon as the surfaces come into contact.

A disadvantage of the known grids is that when they are exposed merely to a slight mechanical force or because of internal corrosion occurring in the course of time, falling out of the mass consequently short-cut is inevitable. In the battery grid 1 according to the present invention the grid structure 4 and lead paste 7 forms such strong chemical bond with the supporting element 5 that the applied lead paste practically cannot be removed. In this manner the internal corrosion is prevented thereby the paste can be retained in its place for a very long time.

Figure 4:
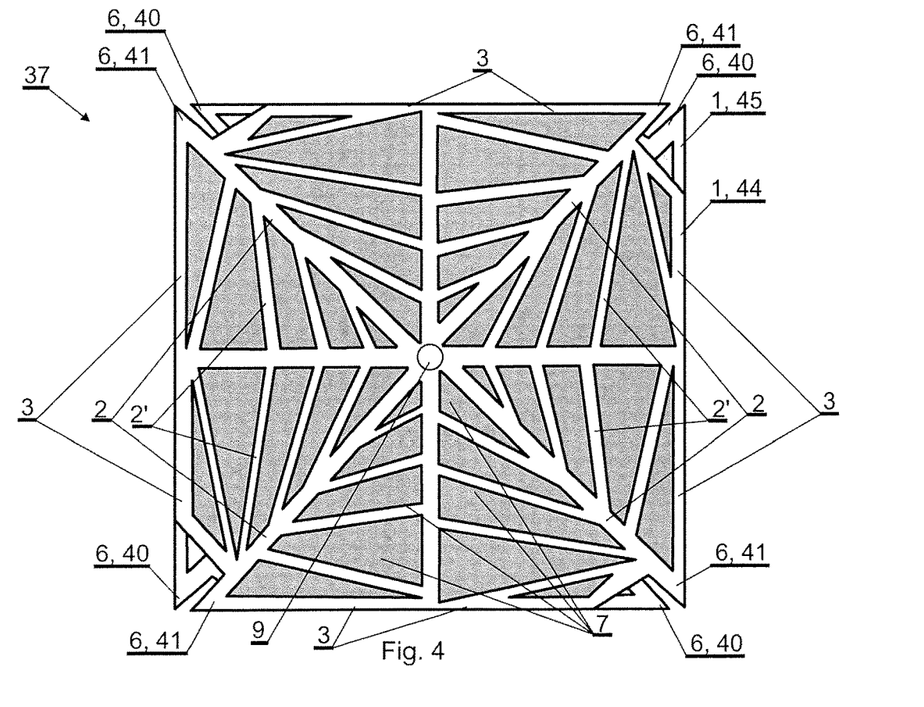
FIG. 4 is the plan view of a pair of battery grids comprising the battery grids according to FIG. 3 as they are turned against each other.

In the embodiment according to the invention battery grid 1 is centrally symmetric having bordering arms 3 shaping a square in which grid arms 2,2' are arranged. Naturally, the bordering arms 3 may shape other forms, e.g. a circle or a regular polygon. At some corners of the bordering arms 3 or disposed at equal distances along their perimeter lugs 6 are formed. The lugs 6 of battery grid 1 are formed in such a manner that when battery grid 1 is reversely positioned on a normally positioned battery grid 1, the lugs 6 of the reversely positioned battery grid 1 and the lugs 6 of the normally positioned battery grid 1 do not overlap each other (FIG. 4).

Grid structure 4 may also be fixed to one side of the supporting element 5. Grid structure 4 not necessarily has the same thickness on the two sides of supporting element 5; grid structure 4 may be fixed to supporting element 5 symmetrically or asymmetrically. In the battery grid 1 perpendicular to the plane of the battery grid 1 at least one through bore 9 is formed.

Figure 12:
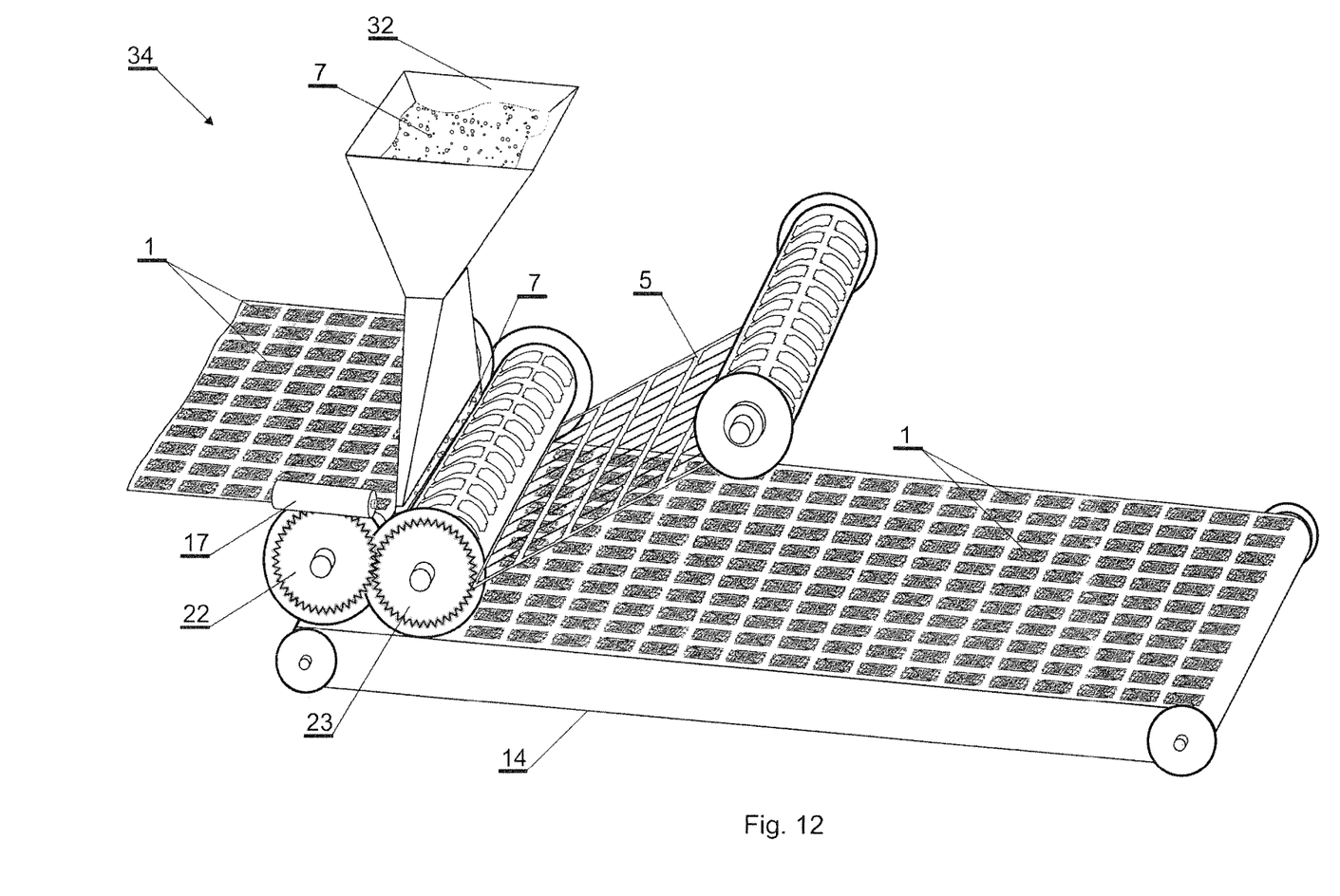
FIG. 12 is the perspective view of the pasting machine.

The apparatus for producing battery grid 1 is applicable for producing the battery grid structure 4 made of molten lead or lead alloy 19 on the fibreglass based supporting element 5, and for coating the supporting element 5 between the grid structure 4 with lead paste 7. The apparatus comprises a manufacturing machine 33 producing the grid structure 4 (FIG. 9) and a pasting machine 34 producing the battery grid 1 (FIG. 12). A pair of pressing cylinders 10 having parallel shafts rotated inversely at a constant speed and kept warm are arranged in manufacturing machine 33. On the superficies 11 of pressing cylinders 10 an endless first pressing belt 15 and second pressing belt 16 moving at a speed corresponding to the circumferential speed of the is pressing cylinders 10 is arranged respectively. In the material of the pressing belts 15, 16 patterns 12 are formed. Patterns 12 represent the negative patterns of grid arms 2,2' and bordering arms 3 of battery grid 1. Patterns 12 of the first pressing belt 15 are the reflected images of the patterns 12 of the second pressing belt 16. The individual patterns 12 formed in first pressing belt 15 are arranged in such a manner that they overlap the respective patterns 12 in the second pressing belt 16. On opposite sides of the pressing belts 15, 16 a heating tunnel 13 is arranged which heats the pressing belts 15, 16 to a temperature of 150-350° C. Within the pressing belts 15, 16 a cooling tunnel 21 is provided for cooling the sides of the pressing belts 15, 16 facing each other. The fibreglass based supporting element 5 is guided through between the pressing belts 15, 16. By means of a liquid metal pump molten lead or lead alloy 19 is fed through a pipe 18 in between the pressing belts 15, 16, basically into the patterns 12 coated with some non-stick material so that molten lead or lead alloy 19 does not stick to patterns 12. Molten lead or lead alloy 19 is fixed to supporting element 5 in the form of the grid structure 4 of the battery grid 1 as determined by patterns 12 through the chemical bond formed between the supporting element 5 and the molten lead or lead alloy 19. Battery grid net 20 produced between pressing belts 15, 16 in this manner is guided through the cooling tunnel 21. Then it is guided in between forced coupled pasting cylinders 22, 23 of the pasting machine 34. The pasting machine 34 has a first pasting cylinder 22 and a second pasting cylinder 23 having parallel shafts rotating inversely. On the superficies 24 of the pasting cylinders 22, 23 plane figures 26 having an outline 25 agreeing with the perimeter of the battery grid 1 are formed as recesses 27 and/or protrusions 28. The distance 29 between the plane figures 26 corresponds to the distance 29 between the battery grids 1 in the battery grid net 20. Along the outline 25 of one of the opposing plane figures 26 cutting edge 31 is provided. Pasting cylinders 22, 23 are matched to each other in such a manner that the plane figures 26 formed on the superficies 24 of the first pasting cylinder 22 overlap the respective plane figures 26 formed on the second pasting cylinder 23. The total depth of the overlapping plane figures 26 of the first and second pasting cylinders 22, 23 corresponds to the thickness 30 of battery grid 1. Battery grids 1 arranged in the battery grid net 20 are guided in between the plane figures 26 provided on the superficies 24 of the pasting cylinders 22, 23 while lead paste 7 is fed in between pasting cylinders 22, 23 from a paste feeder 32. Molten lead 19 is pressed into the grid structure 4 of battery grid 1 by means of pasting cylinders 22, 23.

Figure 9:
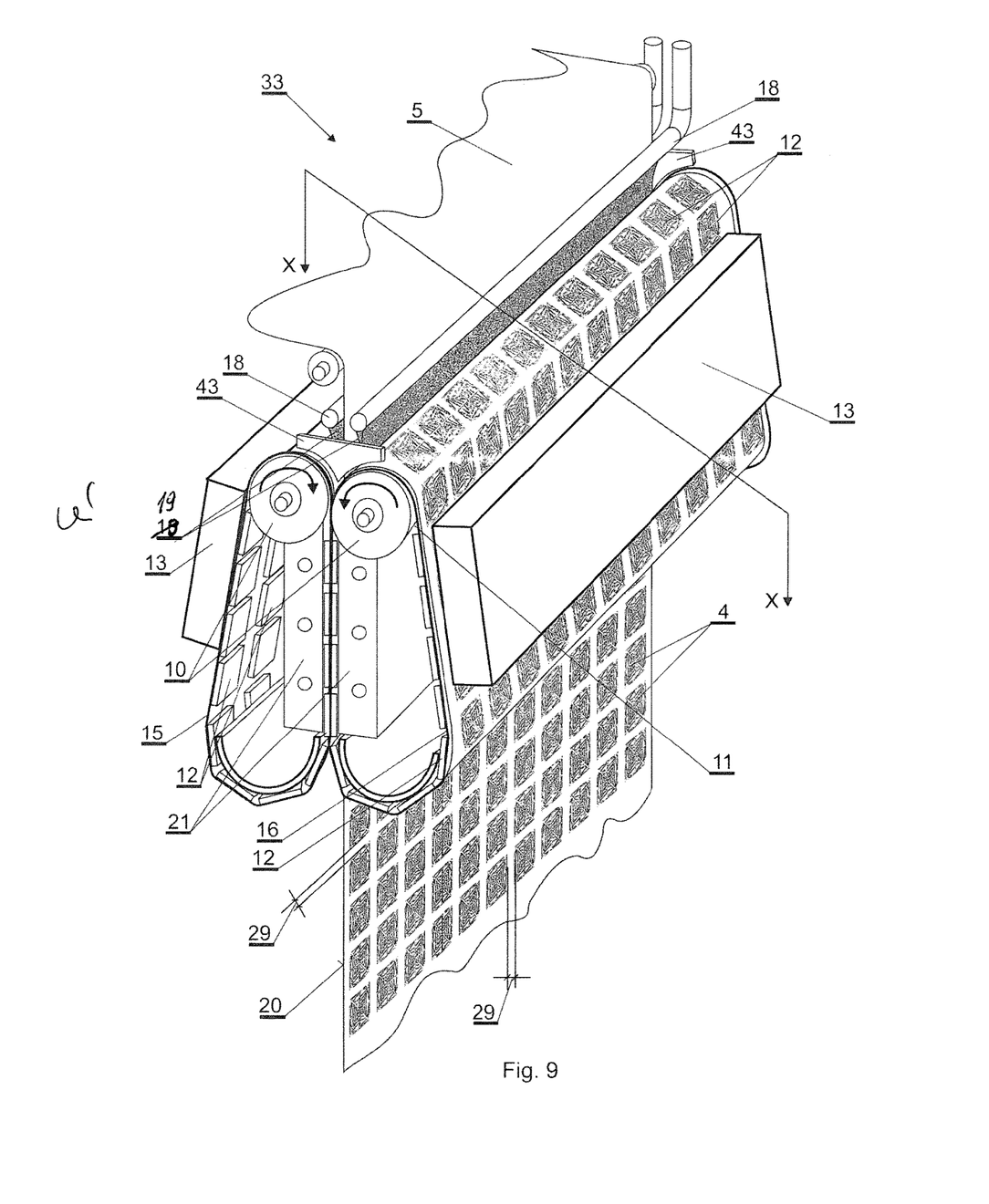
FIG. 9 is the perspective view of the grid structure manufacturing machine.
Figures 10, 11:
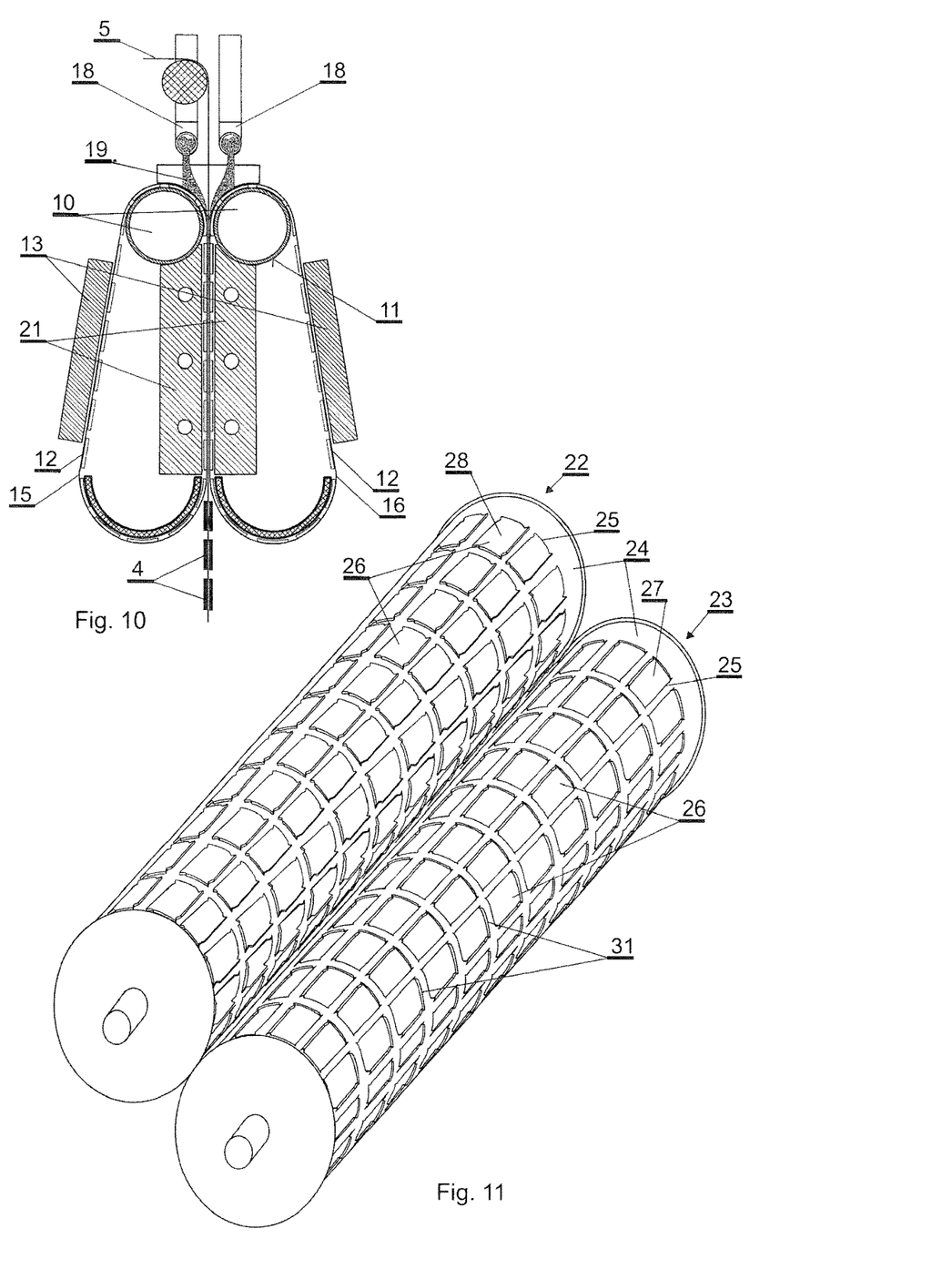
FIG. 10 is a side view showing the cross-section of the grid structure manufacturing machine of FIG. 9 as taken along line X-X.
FIG. 11 is the perspective view of the pasting cylinders.

When the apparatus described above is operated, the first pressing belt 15 and the second pressing belt 16 move on the superficies 11 of the pair of the inversely rotated pressing cylinders 10 having parallel shafts at a speed corresponding to the speed of the superficies 11. Pressing belts 15, 16 provided with patterns 12 presenting the negative pattern of the grid structure 4 of battery grid 1 are guided through heating tunnel 13 at 150-350° C.

The fibreglass based supporting element 5 is introduced in between the first pressing belt 15 and the second pressing belt 16 while the molten lead or lead alloy 19 is fed between the belts 15, 16 through a pipe 18 by means of a liquid metal pump, basically into the patterns 12 coated with some non-stick material so that molten lead or lead alloy 19 does not stick to patterns 12. Flowing of the molten lead 19 to the sides is prevented by means of flanges 43. Molten lead or lead alloy 19 is fixed to supporting element 5 through chemical bond formed between the supporting element 5 and the molten lead or lead alloy 19. Battery grid net 20 produced in this manner is gradually cooled down by guiding it through the cooling tunnel 21 so that the grid structure 4 of battery grid 1 solidifies. Then the battery grid net 20 is guided in between the forced coupled, inversely rotated first pasting cylinder 22 and second pasting cylinder 23 having parallel shafts. Battery grid net 20 is guided through pasting cylinders 22, 23 in such a manner that the battery grids 1 arranged in battery grid net 20 get in between the plane FIGS. 26 formed on the superficies 24 of the pasting cylinders 22, 23. When battery grid net 20 is introduced in between the pasting cylinders 22, 23, lead paste 7 is fed from paste feeder 32 onto battery grid 20 and is pressed into the grid structure 4 of battery grid 1 by means of pasting cylinders 22, 23. Essentially, only the grid structure 4 is coated by lead paste 7 as pasting cylinders 22, 23 force lead paste 7 out from the areas being between grid structure 4. Lead paste 7 is fixed to supporting element 5 through chemical bond formed between the fibreglass based supporting element 5 and lead paste 7. Battery grid 1 provided with the lead paste 7 is cut out by means of cutting edges 31.

With the manufacturing machine 33 and the associated method the heat controlled heating tunnel 13 and cooling tunnel 21 make it possible to cast a grid structure 4 having optional thickness 30, even a thickness of 0.10 mm. After winding off the fibreglass based supporting element 5 from the coil it is guided over a guiding cylinder and through the endless pressing belts 15, 16 while molten lead 19 flows into the trough between pressing belts 15, 16. At the ends of the trough flanges 43 are positioned in order to keep molten lead 19 in between the pressing belts 15, 16. By means of the recesses formed by the patterns 12 etched or pressed in pressing belts 15, 16 i.e. by means of the negative grid patterns supporting element 5 can be drawn in at a constant speed. The surface of the entering fibreglass based supporting element 5 is treated with heat (at 250-300° C.) for a few tenths of a second. Supporting element 5 is guided from above through the space formed by the inversely rotating pressing belts 15, 16 and the continuously heat controlled flanges 43. On the two sides of the supporting element 5 pressing belts 15, 16 and the matching flanges 43 define a basin. Because of lead fume this system is covered with a closed unit. From melting apparatus arranged in the vicinity of the system molten lead with a determined temperature is pressed onto the inversely rotated pressing belts 15, 16 by means of a pump through two parallel pipes 18 having appropriate diameters and evenly spaced perforations. Preferably a level and heat sensor is provided for setting the optimal dosing speed and amount of lead to be fed. This controls the lead pump and also gives a signal to the melting apparatus. The known apparatuses are not shown in the Figures. In lead and in all of its alloys there is always some oxygen present in the form of lead-oxide at molecular thickness of layer. With free silicate anions that can be found on the surface of the fibreglass, this layer forms lead-silicates. This process creates a strong mechanical bond between the lead material of the grid and the fibre glass as well as between the lead paste and the fibreglass. This bond will continuously grow stronger hour by hour, so a week seasoning may be beneficial. Thus the fibreglass based material of the supporting element 5 will form a strong physical and chemical bond with the molten lead or lead alloy 19 while the superficies 11 prevent it from adhering onto the remaining surface, it will peel off. In this way all of the parameters of the product can be determined precisely in advance. However, at this stage the battery grid 1 is not hardened yet. Therefore by means of pressing cylinders 10 the pressing belts 15, 16 having the molten lead 19 and the fibreglass based supporting element 5 in between run into and travel through cooling tunnel 19. As the patterns 12 are continuously kept tightly closed the profile is entirely and hermetically filled with the molten lead 19. Cooling tunnel 21 is controlled by zones. Getting closer to the end of the process the individual zones cool the pressing belts 15, 16 by continuously decreasing direct contact heat transfer. In this manner complete solidification of the profile formed between the closed grid patterns is ensured. Correct heat stability is guaranteed by the water or other cooling agent circulated in the ducts of the cooling tunnel 21. At the end of the cooling tunnel 21 pressing belts 15, 16 moving on a forced path come apart and return to the casting phase. As the pressing belts 15, 16 come apart, battery grid net 20 can freely leave them. At this point molten lead 19 has already hardened on both sides of the battery grid net 20 i.e. the grid structure 4 is complete. The endless pressing belts 15, 16 pass through the heating tunnel 13 again before they reach the casting phase. Then they obtain the optimal temperature necessary for casting and at the casting bay formed at the side of the heated flanges 43 they close together again while supporting element 5 is introduced continuously in between them. On the sheet-like fibreglass based supporting element 5 optional number of grid structure may be produced parallel with each other depending on the width of the pressing belts 15, 16 and the supporting element 5. The grid structures 4 produced in this manner have an even and uniform thickness 30 corresponding to the patterns 12 etched into the superficies of pressing belts 15, 16. Supporting element 5 comes into the mid-plane of the grid structure 4. However, if required, it may be positioned only on one of its sides or shifted from its mid-plane.

Battery grid net 20 may be re-wound for further transportation or may be directed to the pasting machine 34 where it can be coated again continuously with lead paste 7. Then battery grids 1 may be cut to size either before drying or at any time following it. With optimal measurement with a machine having a width of 2 metres in which a pair of 150 cm wide pressing belts 15, 16 running on the superficies 11 of a pair of pressing cylinders 10 each having a diameter of 30 cm is used then guided through the heat treating tunnels at low rpm, approximately 400 000 grid per hour can be produced.

In this manner the lead mass can be decreased to one-third of the presently used lead mass. The entire surface of the supporting element 5 in grid structure 4 forms a strong physical and at the same time definite chemical bond with the lead paste 7. Practically, the two materials cannot be pulled apart again and the lead paste can be retained definitely.

Application of lead paste 7 and cutting of the complete grid is performed in pasting machine 34 having two inversely rotating pasting cylinders 22, 23 the measurements of which correspond to that of the battery grid net 20 manufactured in machine 33. Synchronized rotation of the two pasting cylinders 22, 23 is ensured by the common driving shaft and a pair of cogwheels driven by motor 17. The finished battery grid net 20 leaving the production line is guided in a form-fitting way to the first pasting cylinders 22 of the pair of pasting cylinders 22, 23 whose revolution per minute and diameter equals to that of the pressing cylinders 10 of manufacturing machine 33 so that each of the grid structures 4 fit in a respective recess 27. Then it is rotated so as to match against a respective positive pattern that is a protrusion 28 of the second pasting cylinder 23. Simultaneously with synchronized rotating of the cylinders properly mixed lead paste 7 is introduced in between pasting cylinders 22, 23 from a paste feeder 32 positioned above. During rotation protrusion 28 rolls into recess 27 and presses the properly dense lead paste into the grid structure 4. The space created between recess 27 and protrusion 28 determines the total thickness 30 of the grid structure 4 coated with lead paste 7. Simultaneously with mass pressing-in the same pair of paste cylinders 22, 23 work as a cutter, too. For cutting properly chosen hard metal can be used for example hard chromium plated steel. The angularly properly formed cutting edges 31 precisely meet and cut the material when cylinders 22, 23 lock up, so battery grids 1 pasted with the lead are punched out from battery grid net 20. Upon continued rotation of the cylinders the pattern halves come apart and battery grids 1 from the parting halves get onto a moving conveyor belt 14 positioned underneath. Then they are forwarded immediately to the desiccator and subsequently to the packing-room or are directly used. The fibreglass based supporting element 5 which remains after punching out of the battery grids 1, which is now holed like a net, is wound up by means of a separately driven cylinder positioned above the belt. 100% of this remaining material may be reused.

Figure 5:
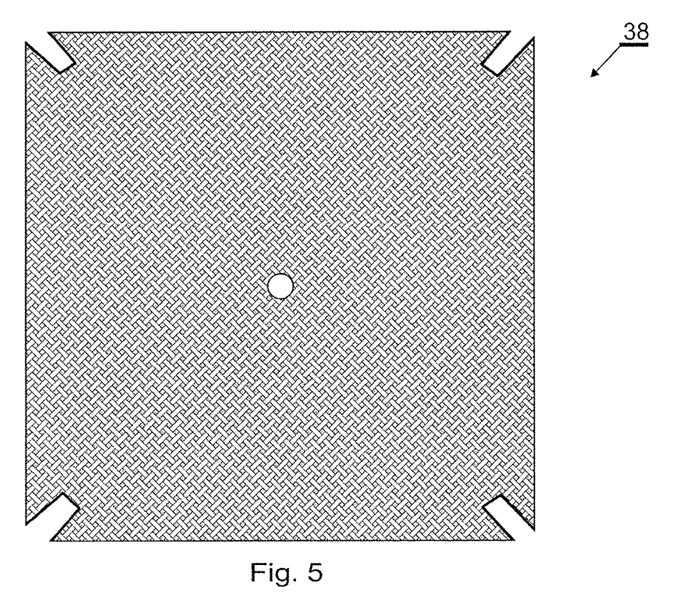
FIG. 5 is the plan view of the separator plate.
Figure 6:
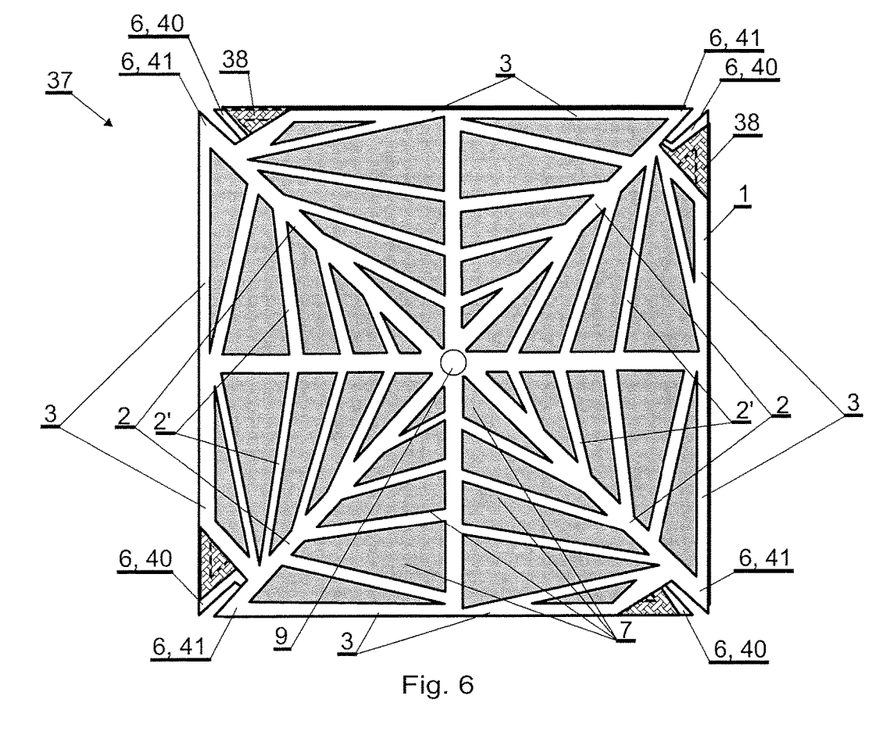
FIG. 6 is the plan view of the pair of battery grids according to FIG. 4 provided with the separator plate.
Figure 7:
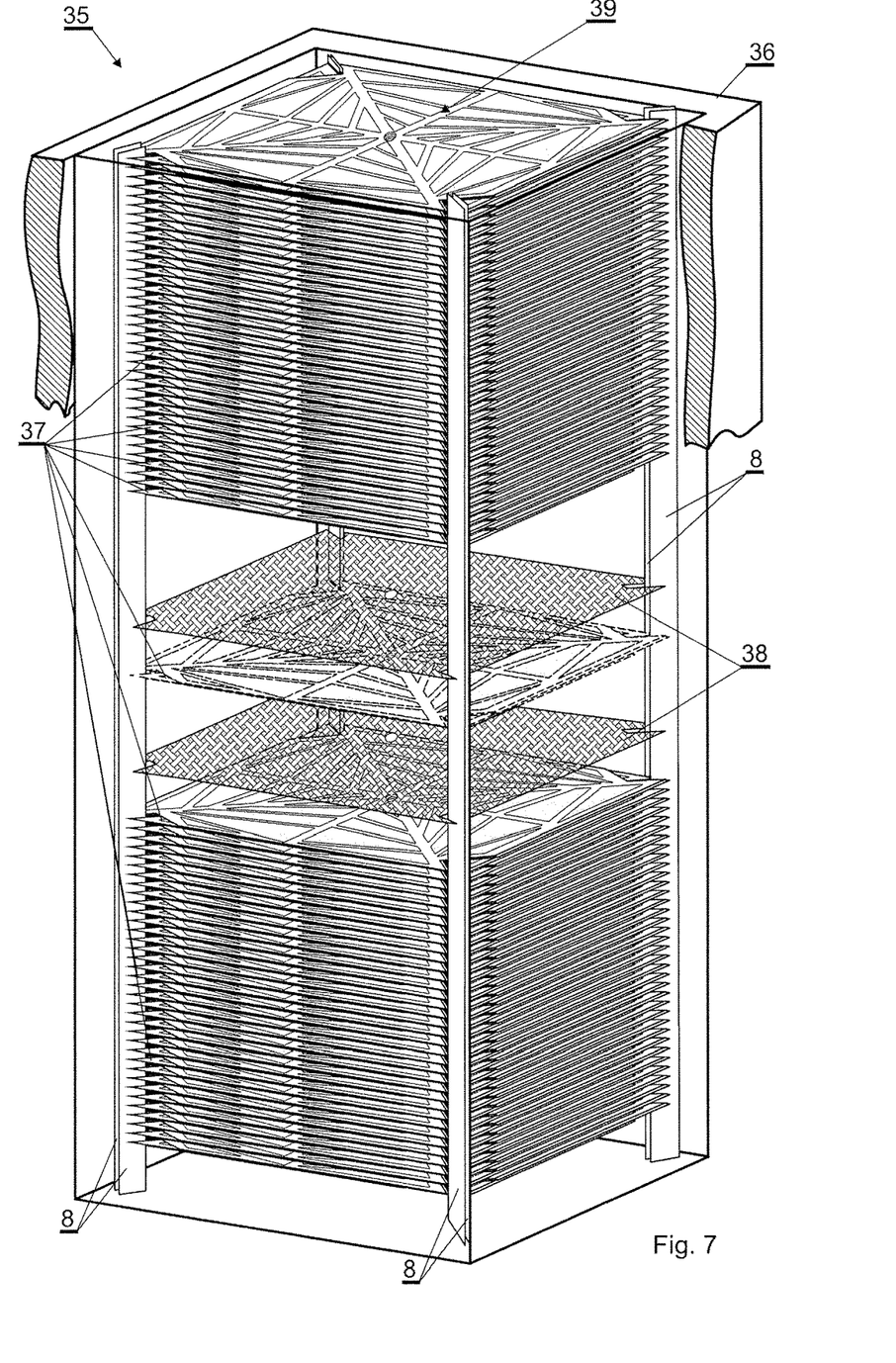
FIG. 7 is a perspective view of the battery cell comprising the battery grid structure.

The present invention also relates to a battery cell 35 formed from the battery grids 1 (FIG. 7). The battery cell 35 comprises positive and negative polarity battery grids 1 placed in a battery housing 36 filled with battery acid. Between the battery grids 1 separator plates 38 (FIG. 5) are placed. The pair of battery grids 37 comprises two identically formed battery grids, namely a first battery grid 44 and a second battery grid 45 placed on each other reversely in such a manner that their bordering arms 3 overlap each other but the lugs 6 of the battery grids 1 are formed in such a manner that lugs 41 of the reversed second battery grid 45 and the lugs 40 of the first battery grid 44 do not overlap each other. That is, the lugs 6 of the essentially overlapping battery grids 1 are freely accessible (FIG. 4). The separator plates 38 are inserted in between the battery grids 1 (FIG. 6). The battery cell 35 comprises several pairs of battery grids 37 insulated from each other by the separator plates 38 (FIG. 7). The separator plates 38 between the pairs of battery grids 37 are not shown in FIG. 7 but naturally, the individual pairs of battery grids 37 are insulated from each other by means of separator plates 38 as it is shown in FIG. 6. The overlapping pairs of battery grids 37 are arranged in parallel planes, on a common axis which is vertical to their planes in such a manner that lugs 6, 40 of each of the first battery grids 44 are connected with each other galvanically and lugs 6, 41 of each of the second battery grids 45 are also connected with each other galvanically by means of the joining element 8. The battery grid system 39 built in this manner is placed in the battery housing 36 filled with battery acid. The lugs 40 connected to joining element 8 and lugs 41 connected to joining element 8 respectively are polarized differently, either positively or negatively. The joining elements 8 having the same polarity are also connected to each other (this is not shown in the Figures as it is clear for those skilled in the art).

Figure 8:
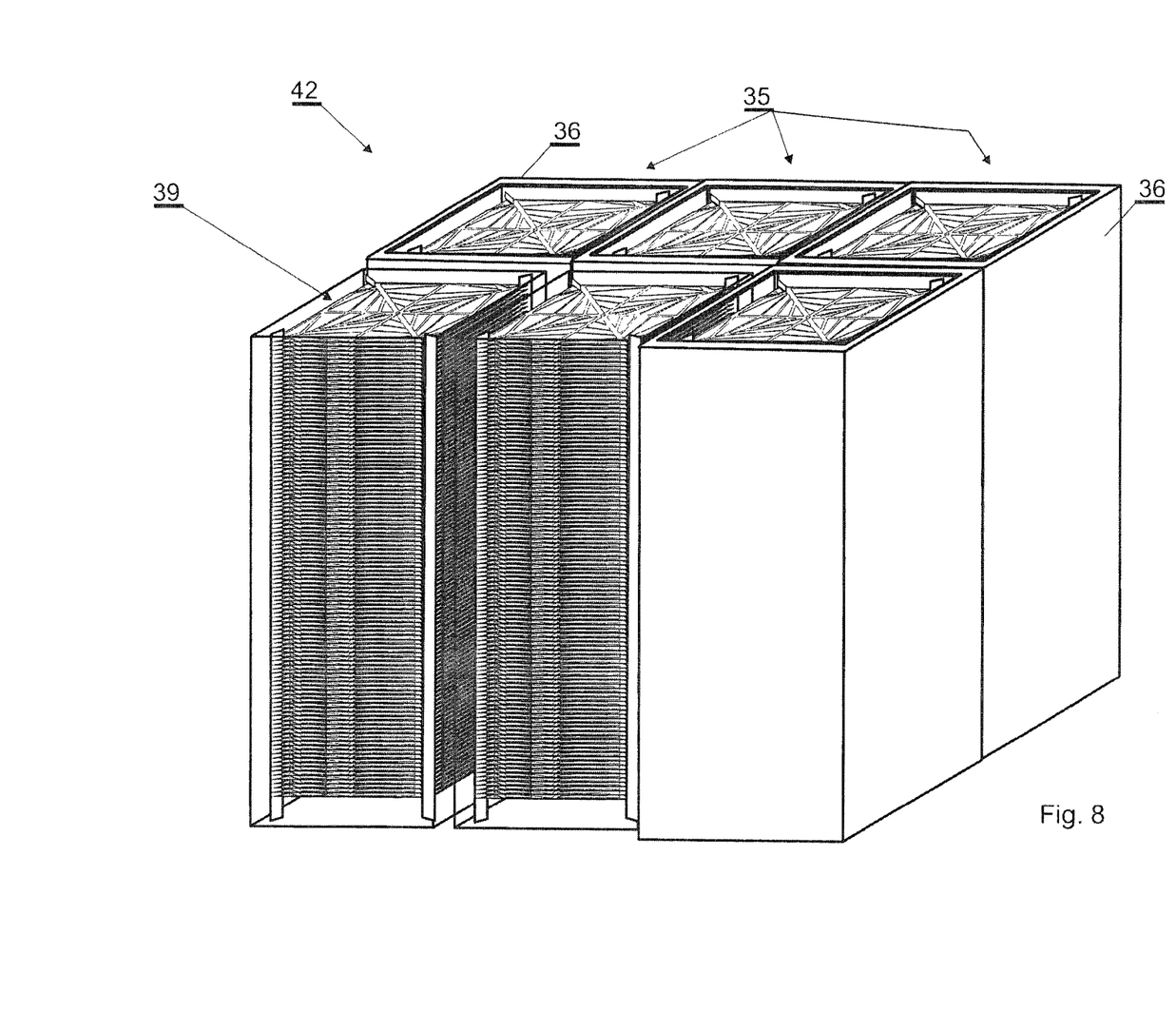
FIG. 8 is a partial sectional view of the fundamental portion of the storage battery comprising the battery cells according to FIG. 7.

The present invention further relates to a storage battery 42 comprising the above described battery cells 35 (FIG. 8). The storage battery 42 comprises several battery cells 35 formed from battery grid systems 39 and placed in a battery housing 36. The battery cells 35 in the storage battery 42 are electrically connected with each other serially or parallel according to their polarity. The same polarity joining elements 8 are also coupled with each other (this is not shown in the Figures as it is clear for those skilled in the art). Storage battery 42 preferably comprises optional number of approximately 2 V battery cells 35, depending on the amount of voltage required for the storage battery. By dividing the surface of the battery grid 1 into segments the current paths in the battery grid are optimized. In this manner the energy generated during the same time on the surface of the battery grid 1 can be accessed simultaneously through several current paths. Thus the whole amount of active energy on the surface of battery grid 1 can be accessed. By means of the 2-4-6-8 or optional number of lugs provided on battery grid 1 the whole amount of active energy stored on battery grid 1 can be utilized, drawn out, transferred or charged in a greater extent. The charging time of the storage battery 42 and also delivery of current is decreased significantly. With the application of separator plates 38 space is gained, the chemical processes can take place in a shorter time between the grids.

In case of possible damage or short circuit there is no need for discarding the whole storage battery 42 if the storage battery 42 built up from battery cells 35 is used, only the damaged battery cell 35 must be replaced.

The advantage of the present invention is that industrial production of a grid having an optional thickness, even a thickness of 0.1 mm becomes possible. Practically, the environmentally harmful and expensive technology, casting of the lead grid, production of calcium or other pre-alloy can be replaced by the solution of the present invention. The pure lead or lead alloy material of the grid is reinforced with a fibreglass insert. The mechanical strength of the battery grid formed on the fibreglass based supporting element is orders of magnitude better than in case of any known solutions. The lead paste is retained on the entire surface of the supporting element. The fibreglass based supporting element will keep the lead mass through strong physical and chemical bond so coming off or peeling off the lead mass from the grid is prevented. Even external or internal mechanical deformation, sudden deflecting force will not cause coming off the lead mass. The fibreglass based supporting element is not fragile. All the parameters of the battery grid according to the invention can be optionally chosen. Transportation or further processing becomes significantly faster, easier and more economical. Safe and cheap mass production of precise, 0.1-0.5 mm thin or thicker grids becomes possible. The module system ensures that a cell can be replaced quickly and easily in case of its failure. The storage battery according to the present invention is resistant to general physical impacts. The cost of manufacture is significantly decreased. By dividing the surface of the grid into segments the current paths in the battery grid are optimized. In this manner the energy generated during the same time on the different surface areas of the battery grid can be accessed simultaneously through several current paths. Further, the through-bore in the middle of the grid structure increases the space of acid and promotes the chemical processes. The whole amount of the active energy of the surface of the battery grid can be utilized, drawn out, transferred or charged as opposed to the known battery grids. The known battery grids have only one lug which involves great loss of current. By providing several lugs the energy generated on the surface of the grid can be accessed through several paths. Similarly, in case of charging the battery can receive the energy through several lugs. The charging time and also delivery of current is decreased significantly. By applying the separator plates space is gained and chemical processes can take place faster. The storage battery according to the present invention may be charged even in half an hour due to the several lugs. During manufacture of the grid, in the casting phase, filling in the patterns is performed at optimal temperature which is essential for producing a 0.1-0.5 mm thick grid. Heat stabilization is solved at the output which is also essential for producing a 0.1-0.5 mm thick grid. Due to the precise technology exactly the same grids can be produced. In this manner the internal energy compensation between the cells can be eliminated. The current paths can be divided optimally within the grid, as a result of which each of the lugs and the internal surface are evenly, simultaneously engaged in charging as well as discharging. The method is significantly cheaper, faster than the known methods. It is environmentally safe, and provides a much higher quality.

The invention claimed is:

1. A battery grid comprising a grid structure formed from grid arms and bordering arms made of lead or lead alloy, a supporting element and lugs, as well as lead paste applied on the surface of the supporting element between the grid arms and the bordering arms; the supporting element comprises fibreglass based material, characterized in that in said grid structure (4) more than one lug (6) is arranged in a given distance—preferably equidistant—from each other along said bordering arm (3); from said lugs (6) grid arms (2) the number of which equals to the number of said lugs (6) are directed to the geometrical center point of said battery grid (1); within said bordering arms (3), between said grid arms (2) which are connected to said lugs (6) further grid arms (2') are internally formed; said grid arms (2, 2') are in galvanic connection with each other, with said bordering arms (3) and said lugs (6).

2. The battery grid according to claim 1 characterized in that the width of said grid arms (2) connected to said lugs (6) is greater than the width of said further grid arms (2').

3. The battery grid according to claim 1 characterized in that said battery grid structure (4) of said battery grid (1) is centrally symmetric.

4. The battery grid according to claim 1 characterized in that said grid arms (2, 2') are surrounded by polygonal bordering arms (3) and said lugs (6) are formed at some corners of said bordering arms (3) in such a manner that when a battery grid (1) is reversely positioned on a normally positioned battery grid (1), said lugs (6) of said reversely positioned battery grid (1) and said lugs (6) of said normally positioned battery grid (1) do not overlap each other.

5. The battery grid according to claim 1 characterized in that said bordering arm (3) has circular cross-section.

6. The battery grid according to claim 1 characterized in that said grid structure (4) is fixed to one side of said supporting element (5).

7. The battery grid according to claim 1 characterized in that said grid structure (4) is fixed to both sides of said supporting element (5) symmetrically or asymmetrically to said supporting element (5).

8. The battery grid according to claim 1 characterized in that in said battery grid (1) perpendicular to the plane of the battery grid (1) at least one through bore (9) is formed preferably in the geometrical center point of said battery grid (1).

9. A battery cell placed in a battery housing filled with acid the battery cell comprising battery grids according to claim 1 the battery grids are arranged in pairs, the pairs of battery grids are composed of two identically formed battery grids, namely a first battery grid and a second battery grid, the first battery grid has positive or negative polarity and the second battery grid has opposite polarity than the first battery grid, between the battery grids separator plates are placed, the lugs of the same polarity battery grids are connected galvanically, characterized in that in said pair of battery grids 37 said first battery grid 44 and said second battery grid 45 are placed on each other reversely in such a manner that their bordering arms 3 overlap each other and the lugs 6 of the battery grid 1 are formed in such a manner that the lugs 41 of the reversed second battery grid 45 and the lugs 40 of the normally positioned first battery grid 44 do not overlap each other, that is, said lugs 6 of the essentially overlapping battery grids 1 are freely accessible; said pairs of battery grids 37 are arranged in parallel planes, on a common axis which is vertical to their planes, in such a manner that the overlapping lugs 40 of each of said first battery grids 44 are connected with each other galvanically by means of a joining element 8 and the overlapping lugs 41 of each of said second battery grids 45 are also connected with each other galvanically by means of a joining element 8; said joining elements 8 connected to the same battery grid 1 are also connected with each other, the battery grid system 39 built in this manner is placed in said battery housing 36 filled with battery acid; and said connected lugs 40 of said first battery grids 44 and said connected lugs 41 of said second battery grids 45 are polarized differently, either positively or negatively.

10. A storage battery composed of battery cells filled with acid, characterized in that said battery cell (35) is a battery cell (35) according to claim 8 and said storage battery (42) contains several battery cells (35) electrically connected with each other serially or parallel according to their polarity.

11. The battery grid according to claim 2 characterized in that said battery grid structure (4) of said battery grid (1) is centrally symmetric.

12. The battery grid according to claim 2 characterized in that said grid arms (2) are surrounded by polygonal bordering arms (3) and said lugs (6) are formed at some corners of said bordering arms (3) in such a manner that when a battery grid (1) is reversely positioned on a normally positioned battery grid (1), said lugs (6) of said reversely positioned battery grid (1) and said lugs (6) of said normally positioned battery grid (1) do not overlap each other.

13. The battery grid according to claim 3 characterized in that said grid arms (2) are surrounded by polygonal bordering arms (3) and said lugs (6) are formed at some corners of said bordering arms (3) in such a manner that when a battery grid (1) is reversely positioned on a normally positioned battery grid (1), said lugs (6) of said reversely positioned battery grid (1) and said lugs (6) of said normally positioned battery grid (1) do not overlap each other.

14. The battery grid according to claim 2 characterized in that said bordering arm (3) has circular cross-section.

15. The battery grid according to claim 3 characterized in that said bordering arm (3) has circular cross-section.

16. The battery grid according to claim 2 characterized in that said grid structure (4) is fixed to one side of said supporting element (5).

17. The battery grid according to claim 3 characterized in that said grid structure (4) is fixed to one side of said supporting element (5).

18. The battery grid according to claim 4 characterized in that said grid structure (4) is fixed to one side of said supporting element (5).

19. The battery grid according to claim 5 characterized in that said grid structure (4) is fixed to one side of said supporting element (5).

20. The battery grid according to claim 2 characterized in that said grid structure (4) is fixed to both sides of said supporting element (5) symmetrically or asymmetrically to said supporting element (5).

* * * * *